(12) United States Patent
Ramaiah

(10) Patent No.: US 9,997,049 B2
(45) Date of Patent: Jun. 12, 2018

(54) EQUIPMENT LIFE SPAN MONITORING SYSTEM AND METHOD

(71) Applicant: ALSTOM TRANSPORT TECHNOLOGIES, Saint-Ouen (FR)

(72) Inventor: Ravindra Ramaiah, Basaveswaranagar Bangalore (IN)

(73) Assignee: Alstom Transport Technologies, Saint-Ouen (FR)

( * ) Notice: Subject to any disclaimer, the term of this patent is extended or adjusted under 35 U.S.C. 154(b) by 9 days.

(21) Appl. No.: 15/178,286

(22) Filed: Jun. 9, 2016

(65) Prior Publication Data

US 2016/0364975 A1    Dec. 15, 2016

Related U.S. Application Data

(60) Provisional application No. 62/173,418, filed on Jun. 10, 2015.

(51) Int. Cl.
*G08B 21/18* (2006.01)
*G05B 23/02* (2006.01)
*G06N 5/04* (2006.01)

(52) U.S. Cl.
CPC ....... *G08B 21/187* (2013.01); *G05B 23/0283* (2013.01); *G06N 5/04* (2013.01)

(58) Field of Classification Search
CPC .... G08B 21/187; G06N 5/04; G01R 31/3648; Y02E 60/12; G01D 4/004
See application file for complete search history.

(56) References Cited

U.S. PATENT DOCUMENTS

| | | | | |
|---|---|---|---|---|
| 5,210,704 A | * | 5/1993 | Husseiny | G01H 1/003 702/34 |
| 5,859,596 A | * | 1/1999 | McRae | H02J 13/0086 324/424 |
| 9,655,197 B1 | * | 5/2017 | Coombes | H04W 88/16 |
| 2010/0250162 A1 | * | 9/2010 | White | G01R 31/3679 702/63 |
| 2011/0029265 A1 | * | 2/2011 | Martens | G01R 31/3679 702/63 |
| 2016/0097698 A1 | * | 4/2016 | Leao | G07C 3/00 702/183 |
| 2016/0097699 A1 | * | 4/2016 | Leao | G07C 3/00 702/34 |

(Continued)

OTHER PUBLICATIONS

Crydom Solid Statements Feb. 2011, The Life Expectancy of Solid State Relays.

(Continued)

*Primary Examiner* — An T Nguyen
(74) *Attorney, Agent, or Firm* — Knobbe, Martens, Olson & Bear, LLP

(57) ABSTRACT

A monitoring system and method monitor one or more operational conditions of first equipment during operation of the first equipment and predict a life span of the first equipment based on the one or more operational conditions. The life span that is predicted differs from a designated life span of the first equipment that is determined prior to operation of the first equipment. The system and method can create or modify schedules for repair or replacement of other equipment to include repair or replacement of the first equipment based on the life span that is predicted.

13 Claims, 4 Drawing Sheets

(56) References Cited

U.S. PATENT DOCUMENTS

2016/0132839 A1* 5/2016 Randolph .............. G06Q 10/20
                                                                            705/305
2016/0364975 A1* 12/2016 R .............................. G06N 5/04
2017/0249004 A1* 8/2017 Flores Assad ........ G06F 1/3212

OTHER PUBLICATIONS

Yuan, S., et al, State of Charge Estimation Using the Extended Kalman Filter for Batter Management Systems Based on the ARX Battery Model, Energies 2013, 6, 444-470.

* cited by examiner

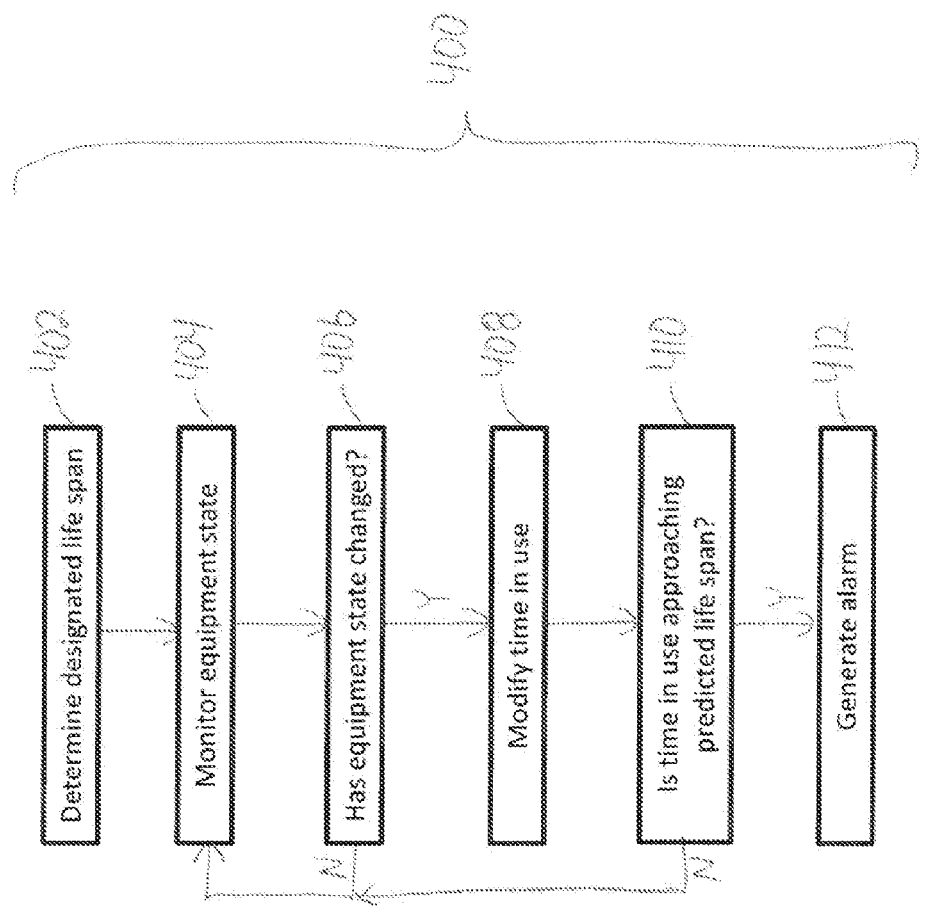

EQUIPMENT LIFE SPAN MONITORING SYSTEM AND METHOD

FIELD

Embodiments of the subject matter disclosed herein relate to determining remaining periods of time of equipment before the equipment fails, requires repair, requires replacement, or the like.

BACKGROUND

Electromechanical equipment and electrical devices can fail after continue usage. For example, equipment such as actuators (e.g., relays, solenoids, etc.), batteries, light bulbs, switches, and the like, can have a life span or life time that represents how long the equipment can operate according to designated specifications of the equipment before the equipment fails and no longer can operate according to the designated specifications.

The life span of equipment can be based on the specifications provided by the manufacturer of the equipment, such as the original equipment manufacturer (OEM) of the equipment. But, this life span may not accurately reflect the real period of time that the equipment can operate. Various external conditions to which the equipment is exposed can change the life span of the equipment. The manner and/or frequency in which the equipment is used also may change this life span. As a result, the OEM-based life span may be longer than the equipment actually does operate according to the designated specifications.

If equipment fails, requires repair, requires replacement or the like before the OEM-based life span, then the equipment may prevent other systems from operating until the equipment is repaired or replaced. For example, if a switch, battery, light bulb, or the like, in a signal used to warn vehicles of speed limits, prohibited locations, etc., fails before the OEM-based life span, then the signal may not operate to warn the vehicles unless and until the failed equipment in the signal is repaired or replaced.

Some systems can generate alarms to notify others of failed equipment. While these alarms can be helpful to discover inoperable equipment, if the alarm occurs before the OEM-based life span, then a system that uses or relies on the failed equipment may still be unable to operate unless or until the alarm is responded to and the equipment repaired or replaced.

BRIEF DESCRIPTION

In one embodiment, a method (e.g., for monitoring equipment) includes monitoring one or more operational conditions of first equipment during operation of the first equipment and predicting a life span of the first equipment based on the one or more operational conditions. The life span that is predicted differs from a designated life span of the first equipment that is determined prior to operation of the first equipment.

In another embodiment, a system (e.g., an equipment monitoring system) includes a monitoring device configured to monitor one or more operational conditions of first equipment during operation of the first equipment and an analysis device configured to predict a life span of the first equipment based on the one or more operational conditions. The life span that is predicted differs from a designated life span of the first equipment that is determined prior to operation of the first equipment.

In another embodiment, another method (e.g., for monitoring equipment) includes monitoring one or more operational conditions of first equipment during operation of the first equipment, predicting a life span of the first equipment based on the one or more operational conditions, examining one or more previously generated schedules for one or more of repair or replacement of second equipment disposed along a route that the first equipment is disposed along, determining whether the one or more of repair or replacement of the second equipment is scheduled to occur after expiration of the life span of the first equipment that is predicted, and automatically modifying at least one of the previously generated schedules to include the one or more of repair or replacement of the first equipment with the one or more of repair or replacement of the second equipment.

BRIEF DESCRIPTION OF THE DRAWINGS

Reference is made to the accompanying drawings in which particular embodiments and further benefits of the inventive subject matter are illustrated as described in more detail in the description below, in which:

FIG. 4 illustrates a flowchart of one embodiment of a method for monitoring equipment.

DETAILED DESCRIPTION

Figure 1:
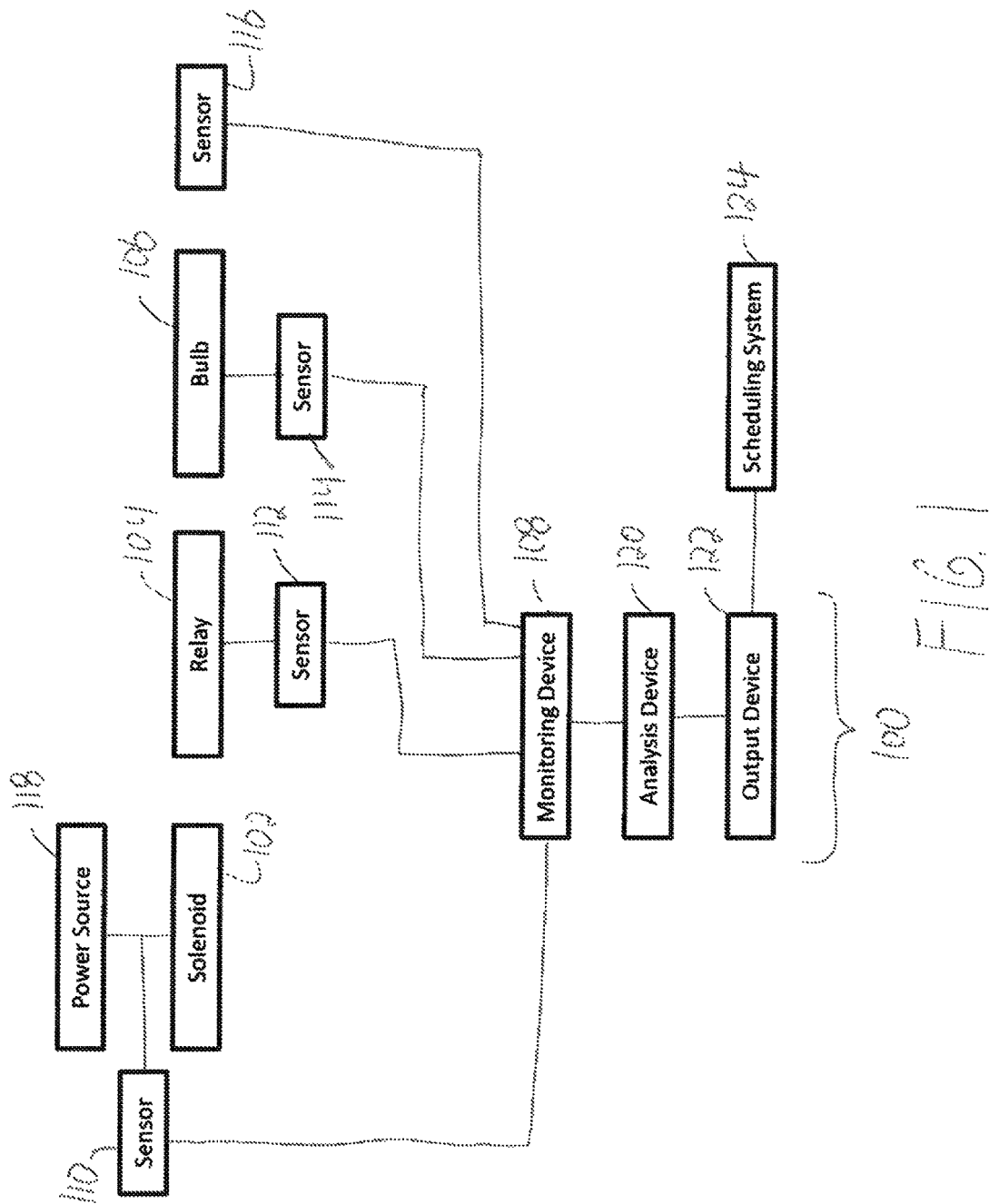
FIG. 1 illustrates one embodiment of a monitoring system.

Embodiments of the subject matter described herein provide for systems and methods that determine life spans of equipment. The systems and methods can predict the end of life of equipment, which represents how much longer the equipment can operate. This prediction may differ from designated life spans of equipment and can be used to trigger alarms or other responsive actions. The alarms or other responsive actions can cause or include repair or replacement of the equipment while the equipment is still operating and before actual failure of the equipment. As a result, systems that include or use the equipment can continue operating without the downtime associated with waiting for repair or replacement of the equipment after failure is discovered. Replacing or repairing equipment before actual failure can reduce the amount of downtime for such systems.

One or more monitoring devices track operational conditions of the equipment, such as the activities or functions of the equipment. For example, sensors can determine the number of charging and discharging cycles of a battery, the temperatures and/or humidity to which the equipment is exposed, the state of charging of a battery, the number of lumens generated by a light bulb at a temperature, humidity, etc. The operational conditions can be recorded for analysis by the one or more monitoring devices to predict a life span of the equipment. The predicted life span or end of life of equipment can be based on a variety of factors. As one example, the remaining useful life of a battery can be determined from a number of charging and discharging cycles of the battery, the temperatures and/or humidity to which the battery is exposed, the state of charging of the battery, and the like. As the number of charging and discharging cycles increases, the temperatures and/or humidity increases, and/or charging time increases or discharge time decreases, the predicted life span may decrease. Conversely, as the number of charging and discharging cycles decreases, the temperatures and/or humidity are at optimized points, and/or charging time is optimal, discharging time increases, the predicted life span may increase.

As another example, the remaining useful life of a light bulb can be determined from a number of lumens generated by the light bulb at a temperature (e.g., at the same temperature). As the number of lumens at a temperature increases, the predicted life span may decrease while the predicted life span may increase as the number of lumens at the temperature decreases.

As another example, the remaining useful life of a relay may be determined by counting a number of times that a command is triggered to activate and deactivate the relay. Optionally, the current passing through a coil of the relay can be monitored. As the number of activation/deactivations increases and/or the current increases, the predicted life span of the relay may decrease. Conversely, for smaller numbers of activation/deactivations and/or for smaller currents, longer life spans may be predicted.

Responsive to the predicted life span falling below a designated threshold, the predicted life span decreasing by at least a designated time period, and/or the actual operating life span of the equipment is within a designated time of the predicted life span, the system may trigger one or more remedial actions. For example, the system can generate an alarm signal that visually and/or audibly notifies an operator of the equipment of the impending failure of the equipment, an alarm that automatically causes repair and/or replacement of the equipment to be scheduled, or the like.

For example, a monitoring system and method can compare the number of active cycles of a relay over a period of time and trigger an alarm based on the frequency of usage of the relay. A first relay may be used for a wireless rail crossing and be operated (e.g., turned on and off) twenty times in a day. A second relay can be used for an interlocking mechanism in a track and be operated one hundred times in a day. Both the first and second relays may have designated life spans (e.g., life spans provided by the manufacturer or life spans that are determined prior to operation of the equipment) of 100,000 cycles before failure. The monitoring system and method can predict a shorter life span for the second relay than the first relay due to the more frequent usage of the second relay. For example, the monitoring system and method can activate an alarm for the first relay responsive to the number of activations of the first relay reaching 99,900 but may activate the alarm for the second relay responsive to the number of activations of the second relay reaching 99,500.

The monitoring system and method can track the predicted life spans of equipment at different locations to more efficiently and thereby schedule repair or replacement of some of the equipment. For example, if several different relays, light bulbs, and the like, are located along the same section of a rail track and at least one of the relays, light bulbs, or other equipment is approaching the end of the predicted life span or has failed, the system and method can schedule (e.g., automatically or otherwise) the replacement of one or more other relays, light bulbs, or the like, that are approaching the predicted life span for the other relays, light bulbs, or the like, but that have not yet failed or reached the threshold for generating an alarm.

FIG. 1 illustrates one embodiment of a monitoring system 100. The monitoring system 100 can be referred to as an equipment life span monitoring system as the system 100 determines (e.g., estimates or predicts) a life span or remaining useful life of equipment 102, 104, 106 that may differ from a life span of the same equipment 102, 104, 106 as designated by a manufacturer of the equipment 102, 104, 106. In the illustrated embodiment, the monitoring system 100 monitors operations of a solenoid (e.g., equipment 102), a relay (e.g., equipment 104), and a light bulb (e.g., equipment 106), but optionally may monitor operations of one or more additional types of equipment or equipment that differs from the equipment shown in FIG. 1.

The system 100 includes a monitoring device 108 that tracks the states and operations of the equipment 102, 104, 106. The monitoring device 108 can include and/or communicate with sensors 110, 112, 114, 116 to monitor operational conditions of the equipment 102, 104, 106. The operational conditions can include activations of the equipment 102, 104, 106, deactivations of the equipment 102, 104, 106, operating temperatures of the equipment 102, 104, 106, ambient temperature around the equipment 102, 104, 106, sounds generated by the equipment 102, 104, 106, lumens generated by the equipment 102, 104, 106, humidity, state of charge of the equipment (e.g., if the equipment is a battery or other energy storage device), etc. Other operational conditions may be monitored. The sensors 110, 112, 114, 116 can generate signals representative of the operational conditions and communicate the signals to the monitoring device 108 via one or more wired and/or wireless connections (e.g., wires, cables, buses, wireless network, etc.). The monitoring device 108 can represent or include receiving or transceiving equipment (e.g., antennas, routers, modems, or the like) that can receive the signals from the sensors 110, 112, 114, 116. The monitoring device 108 may include a memory (e.g., a hard drive, flash drive, optical disk, or the like) for storing the data represented by the signals (e.g., the operational conditions of the equipment 102, 104, 106.

The sensors 110, 112, 114, 116 can represent a variety of devices that measure or otherwise observe operational conditions of the equipment 102, 104, 106. For example, the sensor 110 may represent a voltmeter, amp meter, or the like, that detects the flow of electric current and/or voltage from a power source 118 to the equipment 102 to determine when the equipment 102 is activated or deactivated, to measure a state of charge of equipment, or the like. The power source 118 can represent a battery, utility grid, generator, alternator, flywheel, capacitor, solar panel, or the like. As described herein, one or more of the sensors optionally can measure observational conditions of the power source 118 for reporting to the system 100 in order to predict a remaining life span of the power source 118.

The sensor 112 can represent a switch or other device that determines a position of a relay (e.g., the equipment 104). The sensors 114, 116 can represent current sensors, light sensors, thermometers, or other device that measures lumens generated by the equipment 106 (e.g., the light bulb), the temperature of the equipment 106, or the like. Optionally, one or more other or different sensors may be provided.

The operational conditions obtained by the monitoring device 108 can be examined by an analysis device 120 in order to determine the remaining life span of the equipment 102, 104, 106, and/or 108. The analysis device 120 can represent hardware circuitry that includes and/or is connected with one or more processors (e.g., controllers, microcontrollers, microprocessors, etc.). In one embodiment, the analysis device 120 can include or be part of a computer or computing system that is specially programmed to perform the operations described herein. For example, one embodiment of the analysis device 120 can be a computer that is programmed to perform at least some of the operations described in connection with the flowcharts of the methods disclosed herein.

The analysis device 120 can examine the operational conditions to predict the remaining life span of equipment 102, 104, 106, 108 by comparing the operational conditions of the equipment 102, 104, 106, 108 with operational conditions and previously determined life spans of the same or similar type of equipment. The analysis device 120 may be provided with previously determined life spans of relays, solenoids, light bulbs, batteries, or the like, that are associated with different operational conditions. The operational conditions to which several solenoids are exposed may be monitored until the solenoids fail. These operational conditions can serve as baseline operational conditions to determine when another solenoid is likely to fail. For example, the analysis device 120 may store several different life spans associated with different operational conditions of solenoids. The analysis device 120 can compare the operational conditions of the equipment 102 with the baseline operational conditions associated with the different life spans. If the analysis device 120 determines that the operational conditions of the equipment 102 matches the baseline operational conditions associated with a first life span (or matches the baseline operational conditions associated with the first life span more than one or more other life spans), then the analysis device 120 may predict that the equipment 102 will have the same life span as the first life span. The life span that is predicted by the analysis device 120 can differ from the designated life span provided by the manufacturer or provider of the equipment 102, 104, 106, 108.

The analysis device 120 can update the predicted life span for equipment 102, 104, 106, 108. For example, as the operational conditions of equipment 102, 104, 106, 108 change, the analysis device 120 may determine that the operational conditions match or more closely match the baseline operational conditions associated with a different, second life span (which may be longer or shorter than the first life span). The analysis device 120 can then modify the predicted life span to the second life span. In such a case, predictive algorithm shall have the upper and lower threshold bands for individual equipment used in the field.

The analysis device 120 can be provided with times in use for the different equipment 102, 104, 106, 108. The time in use for equipment 102, 104, 106, and/or 108 represents the time period that the equipment 102, 104, 106, and/or 108 is in use (e.g., in the field). The analysis device 120 can compare the time in use for equipment 102, 104, 106, and/or 108 with the predicted life span of the equipment 102, 104, 106, and/or 108 to determine if the equipment 102, 104, 106, and/or 108 has been used for a period of time that is approaching the predicted life span (e.g., is within a designated threshold of the predicted life span, such as 90%, 95%, 97%, or another percentage or fraction). Responsive to determining that the time in use for equipment 102, 104, 106, 108 is within the designated threshold of the predicted life span, the analysis device 120 can generate an alarm signal.

The alarm signal can be communicated to an output device 122 of the system 100. The output device 122 represents or includes one or more devices that implement remedial actions in response to receiving the alarm signal. The output device 122 can include a visual display (e.g., a touchscreen, mobile phone, computer monitor, light bulb, or the like) that visually presents a notification to an operator of the system 100 that equipment 102, 104, 106, and/or 108 is approaching the predicted service life. Optionally, the output device 122 can include a speaker that audibly notifies the operator that the equipment 102, 104, 106, and/or 108 is approaching the predicted service life.

Additionally or alternatively, the output device 122 can communicate with a scheduling system 124 to schedule the repair or replacement of the equipment 102, 104, 106, 108 that is approaching the predicted service life. The scheduling system 124 can represent one or more computer systems that create and/or modify schedules for persons and/or devices to travel to locations of the equipment 102, 104, 106, 108 to repair and/or replace the equipment 102, 104, 106, 108. For example, the scheduling system 124 can represent a dispatch facility that schedules maintenance crews of persons to repair and/or replace equipment 102, 104, 106, 108. Responsive to receiving a signal from the output device 122 that notifies the scheduling system 124 of equipment 102, 104, 106, 108 that is approaching the end of the predicted life span, the scheduling system 124 can automatically create or modify the schedule of one or more repair persons or devices to include repair or replacement of the equipment 102, 104, 106, 108. The new or modified schedule can then be communicated to the persons and/or devices. Alternatively, the output device 122 can include hardware circuitry that is connected with and/or includes one or more processors that create or modify the schedule. For example, instead of or in addition to the scheduling system 124 creating or modifying the schedule, the output device 122 can create or modify the schedule.

Figure 2:
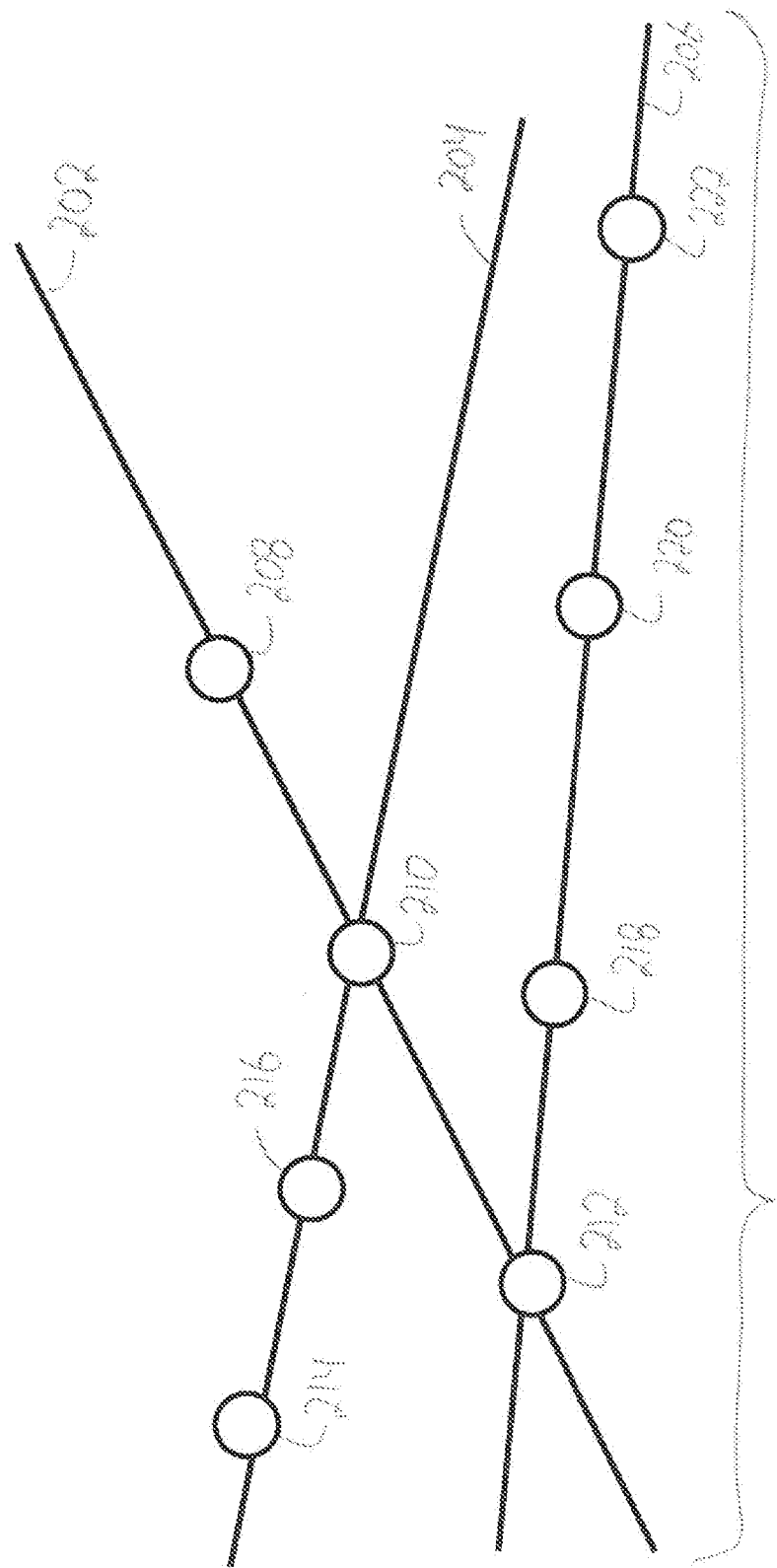
FIG. 2 illustrates a transportation network formed from several interconnected routes according to one embodiment.

FIG. 2 illustrates a transportation network 200 formed from several interconnected routes 202, 204, 206 according to one embodiment. The routes 202, 204, 206 can represent tracks for rail vehicles, roads for automobiles or other vehicles (e.g., off-highway vehicles such as mining vehicles), waterways, or the like. Equipment 208, 210, 212, 214, 216, 218, 220, 222 is disposed on or alongside the routes 202, 204, 206. The equipment 208, 210, 212, 214, 216, 218, 220, 222 can represent one or more of the different types of equipment 102, 104, 106. For example, the equipment 210, 212 can represent relays at switches in intersections between the routes 202, 204, 206, the equipment 208, 214 can represent solenoids, the equipment 218 can represent a battery, and the equipment 220, 222 can represent signals (e.g., that include light bulbs). Alternatively, one or more of the equipment 208, 210, 212, 214, 216, 218, 220, 222 can represent another type of equipment.

The monitoring system 100 shown in FIG. 1 can schedule the repair or replacement of equipment 208, 210, 212, 214, 216, 218, 220, 222 based on the predicted life spans of the equipment 208, 210, 212, 214, 216, 218, 220, 222 and previously generated schedules for the repair or replacement of other equipment. The analysis device 120 (shown in FIG. 1) can examine schedules that were previously generated, such as schedules to inspect, repair, or replace other equipment, and modify these schedules to include the repair and/or replacement of additional equipment.

For example, a previously generated schedule may direct a person to proceed along the route 206 to inspect, repair, or replace the equipment 220. The analysis device 120 can examine the predicted service lives of the other equipment 212, 218, 222 that is disposed along the same route 206 (and/or equipment that is disposed along other routes that the person is scheduled to travel along in order to reach the equipment 220). The predicted service lives of the other equipment 212, 218, 222 can be examined in order to determine whether any of the other equipment 212, 218, 222 should be repaired or replaced. For example, the equipment 218 may have a remaining service life of two weeks, but the next scheduled travel along the route 206 to repair or replace any equipment may not be for another three weeks or more. The analysis device 120 can examine the schedules and service lives to determine if any service lives will expire prior to the next scheduled trip along the route. If one or more of the equipment 212, 218, 222 along the route has a service life that does not yet trigger an alarm for the monitoring system 100 to repair or replace the equipment 212, 218, 222, but has a service life that will expire prior to the next scheduled trip along the route, then the analysis device 120 may modify the schedule to direct the equipment 212, 218, 222 to be repaired or replaced. This can prevent the equipment 212, 218, 222 from failing prior to the next scheduled trip and requiring an additional trip to be scheduled.

Figure 3:
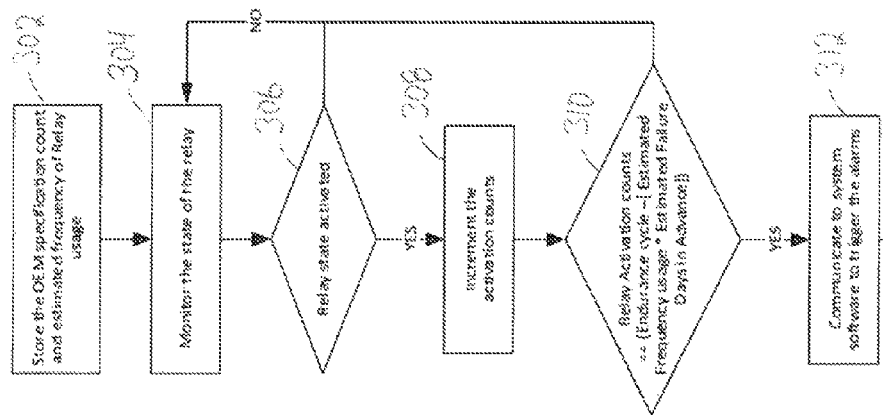
FIG. 3 illustrates a flowchart of one embodiment of a method for monitoring equipment.

FIG. 3 illustrates a flowchart of one embodiment of a method 300 for monitoring equipment. The method 300 is one example of how the monitoring system 100 (shown in FIG. 1) can operate in order to predict a life span of equipment that differs from the life span designated by the manufacturer of the equipment, determine whether the equipment is approaching the end of the predicted life span, and generate an alarm to notify an operator of the impending end of the predicted life span of the equipment. While the method 300 focuses on monitoring a relay, alternatively, one or more other types of equipment can be monitored.

At 302, a designated life span of the equipment is determined. For example, the OEM-designated life span (also referred to as an OEM specification count) is determined and may be stored in a memory. Optionally, an estimated frequency of operation or usage of the equipment may be determined and/or stored. The estimated frequency of usage can be obtained from previous operations of the same or similar equipment.

At 304, the state of the equipment is monitored. For example, a relay can be monitored to determine if the relay is activated or deactivated. One or more of the sensors described above can be used to monitor the state of the equipment.

At 306, a determination is made as to whether the state of the equipment has changed. For example, the state of the relay can be examined to determine if the relay has been activated. If the equipment state has changed (e.g., the relay has been activated), then the equipment may need to be examined to determine if the equipment is approaching the end of the predicted service life of the equipment. As a result, flow of the method 300 can proceed toward 308. On the other hand, if the state of the equipment has not changed, then flow of the method 300 can return toward 304 so that the state of the equipment can continue to be monitored for any changes.

At 308, a time in use value of the equipment is modified. For example, the time that the equipment has been operating and/or the number of times that the equipment has been activated can be increased. With respect to a relay, a count of the number of times that the relay has been activated from a deactivated state may be increased.

At 310, a determination is made as to whether the time in use of the equipment is approaching the end of the predicted life span of the equipment. The predicted life span of the equipment can be determined at 310 or prior to 310. In the illustrated embodiment, the predicted life span is referred to as an endurance cycle of the relay. The number of activations of the relay ("Relay Activation counts" in FIG. 3) can be compared to a difference between the predicted life span ("Endurance cycle" in FIG. 3) and an estimated usage of the equipment (a product of an estimated frequency of usage of the relay or "Estimated frequency usage" in FIG. 3 and a threshold time period, or "Estimated Failure Days In Advance" in FIG. 3). If the number of activations of the relay is within the threshold time period of the predicted life span, then a warning may need to be generated to notify an operator of the impending failure of the equipment. As a result, flow of the method 300 can proceed to 312. On the other hand, if the number of activations is not within the threshold time period of the predicted life span, then a warning may not need to be generated at this time. As a result, flow of the method 300 can return to 304 for further monitoring of the relay.

At 312, an alarm is generated. For example, one or more alarms may be triggered to notify an operator of the impending failure of the equipment, to automatically schedule repair or replacement of the equipment, or the like. The method 300 may then terminate or return to a previous operation.

FIG. 4 illustrates a flowchart of one embodiment of a method 400 for monitoring equipment. The method 400 can be an example of how the monitoring system 100 (shown in FIG. 1) can operate in order to predict a life span of equipment that differs from the life span designated by the manufacturer of the equipment, determine whether the equipment is approaching the end of the predicted life span, and generate an alarm to notify an operator of the impending end of the predicted life span of the equipment. The method 400 provides one specific example of the method 400.

At 402, a designated life span of the equipment is determined. For example, the OEM-designated life span (also referred to as an OEM specification count) is determined and may be stored in a memory. Optionally, an estimated frequency of operation or usage of the equipment may be determined and/or stored. The estimated frequency of usage can be obtained from previous operations of the same or similar equipment. At 404, the state of the equipment is monitored. One or more of the sensors described above can be used to monitor the state of the equipment.

At 406, a determination is made as to whether the state of the equipment has changed. If the equipment state has changed (e.g., the relay has been activated), then the equipment may need to be examined to determine if the equipment is approaching the end of the predicted service life of the equipment. As a result, flow of the method 400 can proceed toward 408. On the other hand, if the state of the equipment has not changed, then flow of the method 400 can return toward 404 so that the state of the equipment can continue to be monitored for any changes.

At 408, a time in use value of the equipment is modified. For example, the time that the equipment has been operating and/or the number of times that the equipment has been activated can be increased. At 410, a determination is made as to whether the time in use of the equipment is approaching the end of the predicted life span of the equipment. The predicted life span of the equipment can be determined at 410 or prior to 410. If the time in use of the equipment is within the threshold time period of the predicted life span, then a warning may need to be generated to notify an operator of the impending failure of the equipment. As a result, flow of the method 400 can proceed to 412. On the other hand, if the time in use of the equipment is not within the threshold time period of the predicted life span, then a warning may not need to be generated at this time. As a result, flow of the method 400 can return to 404 for further monitoring of the relay.

At 412, an alarm is generated. For example, one or more alarms may be triggered to notify an operator of the impending failure of the equipment, to automatically schedule repair or replacement of the equipment, or the like. The method 400 may then terminate or return to a previous operation.

In one embodiment, a method (e.g., for monitoring equipment) includes monitoring one or more operational conditions of first equipment during operation of the first equipment and predicting a life span of the first equipment based on the one or more operational conditions. The life span that is predicted differs from a designated life span of the first equipment that is determined prior to operation of the first equipment.

In one aspect, the one or more operational conditions of the first equipment include one or more of a number of charging and discharging cycles, a temperature, a humidity, a state of charging, a number of activation and deactivation cycles, or a number of lumen hours.

In one aspect, the first equipment includes one or more of a battery, a relay, a solenoid, or a light bulb.

In one aspect, the method also includes generating one or more alarms responsive to a time in use of the first equipment coming within a designated period of time of the life span that is predicted.

In one aspect, generating the one or more alarms includes generating at least one of an audible alarm or a visual alarm to instruct an operator to one or more of repair or replace the first equipment prior to reaching an end of the life span that is predicted.

In one aspect, the method also includes automatically scheduling one or more of repair or replacement of the first equipment to occur prior to an end of the life span that is predicted.

In one aspect, the one or more of repair or replacement of the first equipment is scheduled responsive to a time in use of the first equipment coming within a designated period of time of the life span that is predicted.

In one aspect, automatically scheduling the one or more of repair or replacement of the first equipment includes examining one or more previously generated schedules for one or more of repair or replacement of second equipment disposed along a route that the first equipment is disposed along, determining whether the one or more of repair or replacement of the second equipment is scheduled to occur after expiration of the life span of the first equipment that is predicted, and automatically modifying at least one of the previously generated schedules to include the one or more of repair or replacement of the first equipment with the one or more of repair or replacement of the second equipment.

In another embodiment, a system (e.g., an equipment monitoring system) includes a monitoring device configured to monitor one or more operational conditions of first equipment during operation of the first equipment and an analysis device configured to predict a life span of the first equipment based on the one or more operational conditions. The life span that is predicted differs from a designated life span of the first equipment that is determined prior to operation of the first equipment.

In one aspect, the one or more operational conditions of the first equipment include one or more of a number of charging and discharging cycles, a temperature, a humidity, a state of charging, a number of activation and deactivation cycles, or a number of lumen hours.

In one aspect, the first equipment includes one or more of a battery, a relay, a solenoid, or a light bulb.

In one aspect, the system also includes an output device configured to generate one or more alarms responsive to a time in use of the first equipment coming within a designated period of time of the life span that is predicted.

In one aspect, the output device is configured to generate the one or more alarms by generating at least one of an audible alarm or a visual alarm to instruct an operator to one or more of repair or replace the first equipment prior to reaching an end of the life span that is predicted.

In one aspect, the analysis device is configured to automatically schedule one or more of repair or replacement of the first equipment to occur prior to an end of the life span that is predicted.

In one aspect, the analysis device is configured to schedule the one or more of repair or replacement of the first equipment responsive to a time in use of the first equipment coming within a designated period of time of the life span that is predicted.

In one aspect, the analysis device is configured to automatically schedule the one or more of repair or replacement of the first equipment by examining one or more previously generated schedules for one or more of repair or replacement of second equipment disposed along a route that the first equipment is disposed along, determining whether the one or more of repair or replacement of the second equipment is scheduled to occur after expiration of the life span of the first equipment that is predicted, and automatically modifying at least one of the previously generated schedules to include the one or more of repair or replacement of the first equipment with the one or more of repair or replacement of the second equipment.

In another embodiment, another method (e.g., for monitoring equipment) includes monitoring one or more operational conditions of first equipment during operation of the first equipment, predicting a life span of the first equipment based on the one or more operational conditions, examining one or more previously generated schedules for one or more of repair or replacement of second equipment disposed along a route that the first equipment is disposed along, determining whether the one or more of repair or replacement of the second equipment is scheduled to occur after expiration of the life span of the first equipment that is predicted, and automatically modifying at least one of the previously generated schedules to include the one or more of repair or replacement of the first equipment with the one or more of repair or replacement of the second equipment.

In one aspect, the life span that is predicted differs from a designated life span of the first equipment that is determined prior to operation of the first equipment.

In one aspect, the one or more operational conditions of the first equipment include one or more of a number of charging and discharging cycles, a temperature, a humidity, a state of charging, a number of activation and deactivation cycles, or a number of lumen hours.

In one aspect, the first equipment includes one or more of a battery, a relay, a solenoid, or a light bulb.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended clauses, along with the full scope of equivalents to which such clauses are entitled. In the appended clauses, the terms "including" and "in which" are used as the plain-English equivalents of the respective terms "comprising" and "wherein." Moreover, in the following clauses, the terms "first," "second," and "third," etc. are used merely as labels, and are not intended to impose numerical requirements on their objects. Further, the limitations of the following clauses are not written in means-plus-function format and are not intended to be interpreted based on 35 U.S.C. § 112(f), unless and until such clause limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter may include other examples that occur to those of ordinary skill in the art. Such other examples are intended to be within the scope of the clauses if they have structural elements that do not differ from the literal language of the clauses, or if they include equivalent structural elements with insubstantial differences from the literal languages of the clauses.

As used herein, an element or step recited in the singular and proceeded with the word "a" or "an" should be understood as not excluding plural of said elements or steps, unless such exclusion is explicitly stated. Furthermore, references to "an embodiment" or "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

The invention claimed is:

1. A method comprising:
storing a designated life span for a first equipment into a memory;
monitoring one or more operational conditions of the first equipment during operation of the first equipment;
predicting a life span of the first equipment based on the one or more operational conditions, wherein the life span that is predicted differs from the designated life span of the first equipment that is determined prior to operation of the first equipment; and
automatically scheduling one or more of repair or replacement of the first equipment to occur prior to an end of the life span that is predicted, wherein automatically scheduling the one or more of repair or replacement of the first equipment includes:
examining one or more previously generated schedules for the one or more of repair or replacement of second equipment disposed along a route that the first equipment is disposed along;
determining whether the one or more of repair or replacement of the second equipment is scheduled to occur after expiration of the life span of the first equipment that is predicted; and
automatically modifying at least one of the previously generated schedules to include the one or more of repair or replacement of the first equipment with the one or more of repair or replacement of the second equipment;
wherein the one or more operational conditions of the first equipment include one or more of a number of charging and discharging cycles, a temperature, a humidity, a state of charging, a number of activation and deactivation cycles, or a number of lumen hours.

2. The method of claim 1, wherein the first equipment includes one or more of a battery, a relay, a solenoid, or a light bulb.

3. The method of claim 1, further comprising generating one or more alarms responsive to a time in use of the first equipment coming within a designated period of time of the life span that is predicted.

4. The method of claim 3, wherein generating the one or more alarms includes generating at least one of an audible alarm or a visual alarm to instruct an operator to one or more of repair or replace the first equipment prior to reaching an end of the life span that is predicted.

5. The method of claim 1, wherein the one or more of repair or replacement of the first equipment is scheduled responsive to a time in use of the first equipment coming within a designated period of time of the life span that is predicted.

6. A system comprising:
a memory for storing a designated life span for a first equipment;
a monitoring device configured to monitor one or more operational conditions of the first equipment during operation of the first equipment; and
an analysis device configured to predict a life span of the first equipment based on the one or more operational conditions, wherein the life span that is predicted differs from the designated life span of the first equipment that is determined prior to operation of the first equipment,
wherein the analysis device is configured to automatically schedule one or more of repair or replacement of the first equipment to occur prior to an end of the life span that is predicted by examining one or more previously generated schedules for the one or more of repair or replacement of second equipment disposed along a route that the first equipment is disposed along, determining whether the one or more of repair or replacement of the second equipment is scheduled to occur after expiration of the life span of the first equipment that is predicted, and automatically modifying at least one of the previously generated schedules to include the one or more of repair or replacement of the first equipment with the one or more of repair or replacement of the second equipment
wherein the one or more operational conditions of the first equipment include one or more of a number of charging and discharging cycles, a temperature, a humidity, a state of charging, a number of activation and deactivation cycles, or a number of lumen hours.

7. The system of claim 6, wherein the first equipment includes one or more of a battery, a relay, a solenoid, or a light bulb.

8. The system of claim 6, further comprising an output device configured to generate one or more alarms responsive to a time in use of the first equipment coming within a designated period of time of the life span that is predicted.

9. The system of claim 8, wherein the output device is configured to generate the one or more alarms by generating at least one of an audible alarm or a visual alarm to instruct an operator to one or more of repair or replace the first equipment prior to reaching an end of the life span that is predicted.

10. The system of claim 6, wherein the analysis device is configured to schedule the one or more of repair or replacement of the first equipment responsive to a time in use of the first equipment coming within a designated period of time of the life span that is predicted.

11. A method comprising:
   monitoring one or more operational conditions of first equipment during operation of the first equipment;
   predicting a life span of the first equipment based on the one or more operational conditions;
   examining one or more previously generated schedules for one or more of repair or replacement of second equipment disposed along a route that the first equipment is disposed along;
   determining whether the one or more of repair or replacement of the second equipment is scheduled to occur after expiration of the life span of the first equipment that is predicted; and
   automatically modifying at least one of the previously generated schedules to include the one or more of repair or replacement of the first equipment with the one or more of repair or replacement of the second equipment,
   wherein the one or more operational conditions of the first equipment include one or more of a number of charging and discharging cycles, a temperature, a humidity, a state of charging, a number of activation and deactivation cycles, or a number of lumen hours.

12. The method of claim 11, wherein the life span that is predicted differs from a designated life span of the first equipment that is determined prior to operation of the first equipment.

13. The method of claim 11, wherein the first equipment includes one or more of a battery, a relay, a solenoid, or a light bulb.

* * * * *